United States Patent

[11] 3,592,341

| [72] | Inventors | Robert C. Emmett, Jr.<br>Dundee, Ill.;<br>Donald A. Dahlstrom, Salt Lake City, Utah |
|---|---|---|
| [21] | Appl. No. | 692 |
| [22] | Filed | Jan. 5, 1970 |
| [45] | Patented | July 13, 1971 |
| [73] | Assignee | Envirotech Corporation<br>Salt Lake City, Utah |

[54] METHOD AND APPARATUS FOR STEAM DRYING FILTER CAKE
12 Claims, 4 Drawing Figs.

[52] U.S. Cl. .................................................. 210/68;
210/179
[51] Int. Cl. .................................................. B01d 37/00

[50] Field of Search .................................. 210/68, 179

[56] References Cited
UNITED STATES PATENTS
3,361,259  1/1968  Von Der Gathen et al. .... 210/68 X

*Primary Examiner*—Carroll B. Dority, Jr.
*Attorneys*—Robert R. Finch and Richard F. Bojanowski ABSTRACT: A method and apparatus is disclosed for steam-drying filter cake formed on a drum on disc-type vacuum filter which is mounted for rotation in an enclosed feed slurry tank. To block heat loss and subsequent condensation of the steam within the enclosed area, an insulating barrier is floated on the feed slurry to maintain a thermal separation therebetween.

INVENTORS.
ROBERT C. EMMETT JR.
DONALD A. DAHLSTROM
BY
ATTORNEY

INVENTORS.
ROBERT C. EMMETT JR.
DONALD A. DAHLSTROM
BY
ATTORNEY

3,592,341

METHOD AND APPARATUS FOR STEAM DRYING FILTER CAKE

BACKGROUND OF INVENTION

This invention relates, generally, to pressure differential filtration and, in particular, to filtration in which a relatively drier filter cake is obtained by passing steam through the filter cake formed on the filter.

Although the use of steam as an aid for reducing the moisture content of a filter cake is well known, certain inefficiencies result when the steam drying operation is conducted in close proximity to the feed slurry. These inefficiencies are due to the cooling effect that a liquid feed slurry has on the steam. If this cooling effect is not counteracted or in some way controlled, premature steam condensation can result and/or increased steam consumption due to condensation of steam in the feed slurry.

OBJECTS OF INVENTION

The primary object of this invention is to provide a method and apparatus for minimizing steam heat loss and premature steam condensation during filter cake steam-drying operations.

Another object is to provide an improved method and apparatus for steam drying a filter cake whereby the steam atmosphere is thermally separated from the feed slurry in a tank by the expedient of floating a thermal insulating barrier on the surface of the slurry.

Still another object is to provide a method for avoiding substantial rewetting of a relatively dry filter cake during steam-drying operations.

Another object is the provision of filtration apparatus for automatically maintaining an insulating layer of foam or froth on the surface of a feed slurry held in a filter tank while enabling a continual withdrawal of filtrate therefrom and the introduction of new feed thereto.

SUMMARY OF INVENTION

The foregoing and, possibly, other objects of the invention are attained by the use of an enclosed or hooded rotary disc filter whereby one or more substantially circular discs are mounted on a horizontal shaft for rotation into and out of an insoluble-bearing liquid, such as a slurry. During rotation, a vacuum is applied to the filter surface, causing the solids to become separated from the liquid, with the eventual formation of a filter cake on the filter. As the cake emerges from the slurry, the application of vacuum is continued and additional dewatering is achieved by drawing steam therethrough. If desired, even further drying may be effected by drawing dry air through the heated cake prior to discharge from the filter.

To minimize heat losses resulting from the cooling effect that the feed slurry has on the steam, an insulating layer is superimposed on the surface of the feed slurry to provide a system whereby a thermal separation is maintained between the upper steam zone and the lower feed zone.

In accordance with one embodiment of this invention, the insulating layer comprises a flotatable material such as cork or polymeric particles having a low heat conductivity. In another embodiment, the insulating barrier comprises a foam or froth generated by the feed slurry, either naturally or induced by the addition of foam-producing reagents. In either embodiment, the insulating barrier is preferably a material having pockets of trapped air.

The desired level of feed slurry is maintained in the usual fashion, such as with a controlled inlet or overflow weir; however, if the insulating layer comprises foam or froth, a foam retainer baffle and separate overflows positioned above the slurry level are provided.

In order that the invention may be more readily understood and carried into effect, reference is made to the accompanying drawings and the following description thereof, which are presented by way of illustration only and are not to be taken as limiting the invention, the scope of which is defined by the appended claims rather than by any preceding description.

Figure 1:
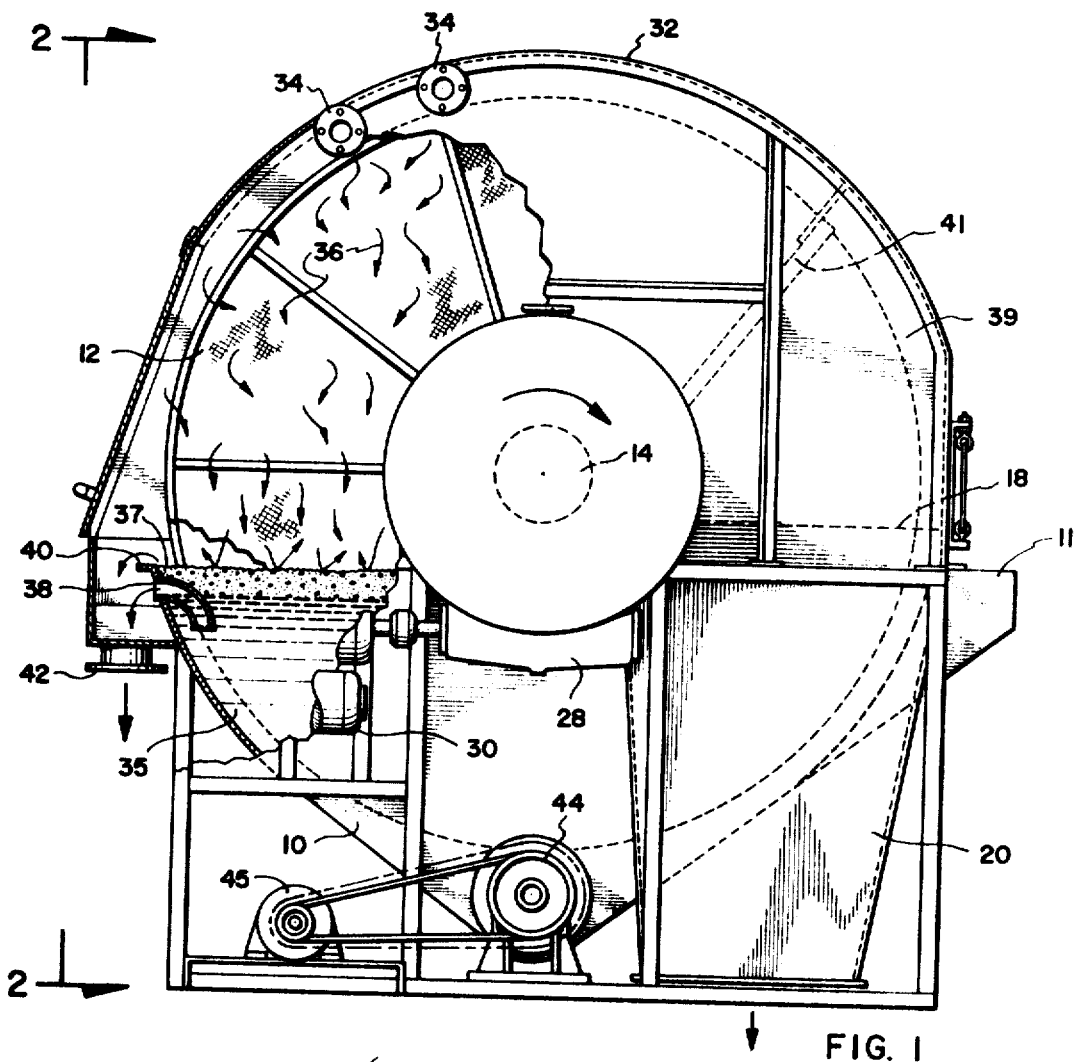
FIG. 1 is a side elevational view of a rotary disc filter, portions of which are cut away to show details of construction.

In the drawings, the invention is illustrated as embodied in a rotary disc filter of conventional design, which broadly comprises an elongated slurry tank 10 having a feed inlet 11, one or more filter discs 12 secured to a barrel 14 which is basically a rotatable, tubular shaft journaled in bearings 16 at opposite ends of the tank. The barrel is of usual construction, enabling attachment of a plurality of filter discs thereto.

Scrapers 18, shown by dotted lines, are provided adjacent opposite faces of each disc to assist in cake discharge and to direct the cake into wells or troughs (not shown) adjacent each disc and which lead into a common collecting bin 20. A vacuum line (not shown) is attached to connectors 21 and 25 to draw filtrate through the filter medium and into connector 21 to discharge, while the separated solids are collected as a cake on the surface of the filter medium.

The other connector 25 draws steam through the filter cake during steam drying to discharge. As the filter cake emerges from the liquid and passes through the insulating barrier, the vacuum level is normally reduced (by conventional means) to avoid collecting the insulating material on the filter cake.

The discs are driven by a conventional drive means which normally includes a worm gear assembly 28 and motor 30. The tank is enclosed by a hood 32 having suitable steam inlets 34. The steam 36 is maintained separate from the feed slurry 35 by a floating barrier 37 of a material formed with pockets of included air.

The steam zone is also separated from the cool air zone 39 by seals 41 located adjacent each side of the discs and extending from the inner edge of the hood 32 to the barrel 14.

As shown in FIG. 1, the feed slurry is maintained at a constant level by a curved conduit or elbow 38 having one end extending through the side of the tank into an outlet 42 and the other end submerged in the liquid 35. The insulating layer is floated above the elbow and is maintained at the desired elevation by the sidewall of the tank or with an overflow weir 40. Excess liquid and insulating materials are discharged through a suitable outlet 42. The solids in the feed slurry are kept in suspension by an agitation means 44 driven by motor 45.

Figure 3:
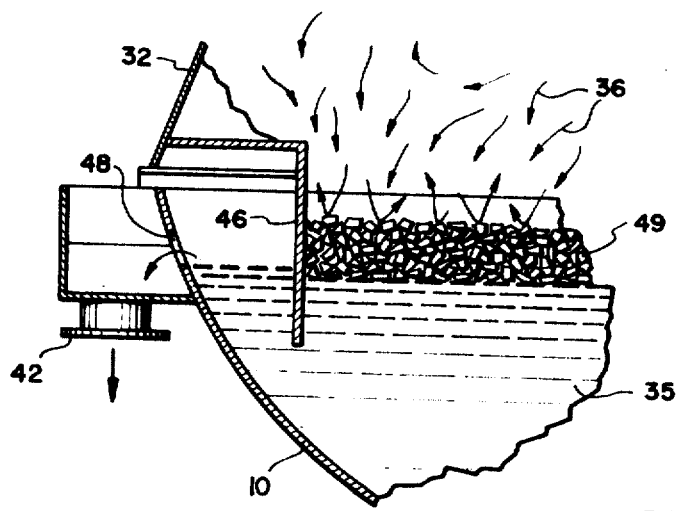
FIG. 3 is a partial side sectional view of a filter, similar to that of FIGS. 1 and 2, showing details of a baffle arrangement for retaining a desired level of insulating material on the surface of the feed slurry.
Figure 2:
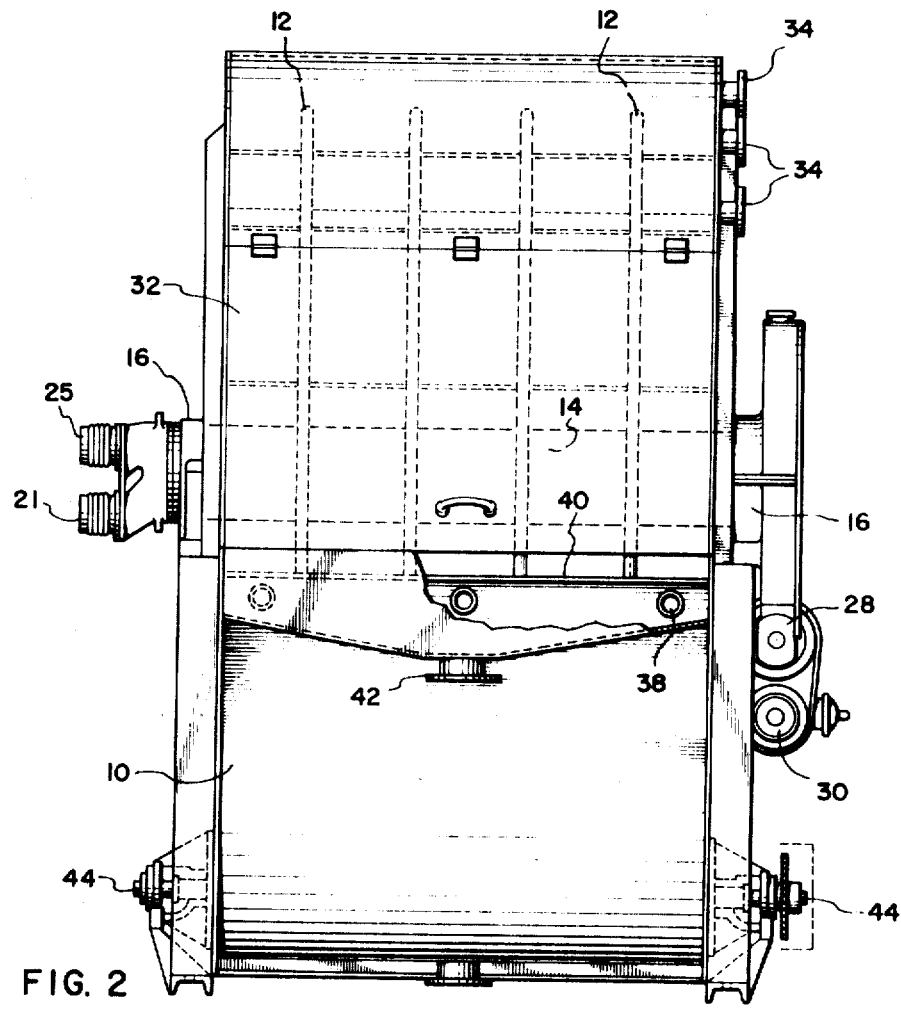
FIG. 2 is a front elevational view of the filter shown in FIG. 1.

In FIG. 3, another means for controlling the liquid level is shown in which a vertical baffle or weir 46 extends into the liquid 35 inboard of the tank wall. The level of the liquid is maintained constant by outlet ports 48 located in the tank wall and in communication with outlet 42. In this embodiment, the insulating layer comprises a floating polymeric material such as chips or particles 49 having a low-heat conductivity in amounts sufficient to provide a layer having a thickness or a depth best suited for the degree of thermal insulation desired.

Figure 4:
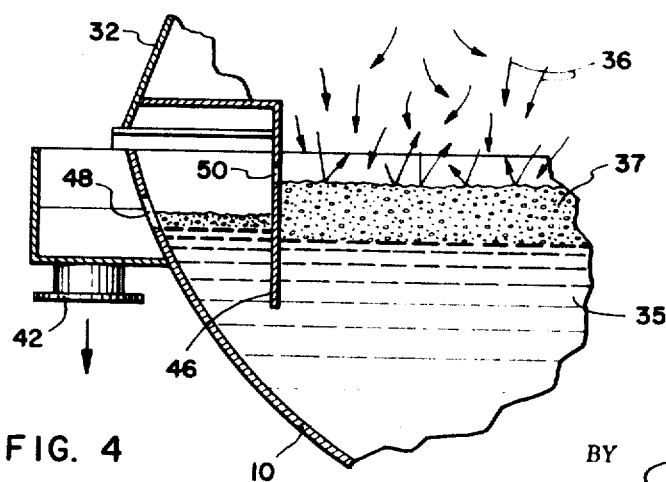
FIG. 4 is a view similar to that of FIG. 3 but illustrates a different system for controlling liquid and foam elevations.

In FIG. 4, a variation of the embodiment depicted in FIG. 3 is shown. In the FIG. 4 embodiment, an opening 50 is provided in the baffle 46 to permit foam 37 generated by liquid 35 in excess of a predetermined amount to overflow through opening 50 to discharge via outlet port 48 and outlet conduit 42.

While the invention has been described with reference to several specific embodiments, it should be understood that certain changes in construction may be made by one skilled in the art and would not thereby depart from the spirit and scope

What I claim is:

1. An improved method for drying a filter cake formed by continuous vacuum filtration of a feed slurry comprising passing steam through said filter cake in a zone above the surface of said feed slurry while maintaining thermal separation between said steam and said feed slurry by floating on said feed slurry a layer of insulating material.

2. Method according to claim 1 wherein said insulating material comprises a material containing trapped air.

3. Method according to claim 2 wherein said insulating material is foam.

4. Method according to claim 1 wherein said insulating material comprises a flotatable material having a low-heat conductivity.

5. Method according to claim 4 wherein said flotatable material comprises a layer of polymeric particles.

6. In a pressure differential filter of the type having a tank for holding a feed material to be filtered, means for introducing the feed material into said tank, a filter element mounted for rotation in said tank, means for rotating said filter element into and out of said feed material, a cover over said tank forming an enclosure therewith, and means for introducing a heated gaseous fluid into said enclosure; the improvement comprising means for maintaining the upper surface of the feed material at a substantially constant elevation, and means for maintaining a layer of flotatable, insulating material on the surface of said feed material to maintain a thermal separation between the feed material and the fluid introduced into said enclosure.

7. Apparatus according to claim 6, in which said means for maintaining a layer of flotatable insulating material includes a baffle extending from below the elevation of said upper surface of feed material to above said elevation and an overflow means to maintain the upper surface of feed material at said substantially constant elevation, said baffle extending vertically between elevations above and below said overflow means.

8. Apparatus according to claim 6, wherein the means for maintaining said upper surface of feed material at a substantially constant elevation and for maintaining said layer of flotatable insulating material thereon includes a sidewall extending above the feed material and a conduit having one end extending through said wall into said tank at an elevation below the top of said sidewall.

9. In an enclosed system for drying a filter cake formed on a rotary vacuum filter having a lower cake forming zone in which the filter cake is formed and an upper drying zone containing steam for passage through the filter cake, the improvement comprising a flotatable thermal barrier positioned between the cake forming zone and the drying zone.

10. The system of claim 9 wherein the flotatable thermal barrier comprises an insulating material formed with included air.

11. The system of claim 10 wherein the insulating material is foam generated by the liquid feed.

12. The system of claim 10 wherein the thermal barrier comprises a polymeric material having a low-heat conductivity.